(12) United States Patent
Rouleau et al.

(10) Patent No.: US 6,612,198 B2
(45) Date of Patent: Sep. 2, 2003

(54) LASH-FREE CABLE DRIVE

(75) Inventors: James Edward Rouleau, Burt, MI (US); James Anthony Smazenka, Midland, MI (US); Scott A. Stinebring, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 100 days.

(21) Appl. No.: 10/002,571

(22) Filed: Nov. 1, 2001

(65) Prior Publication Data

US 2003/0079563 A1 May 1, 2003

(51) Int. Cl.⁷ .................................................. B62D 1/18
(52) U.S. Cl. ......................................... 74/493; 280/775
(58) Field of Search ........................ 74/493, 494, 495; 280/775

(56) References Cited

U.S. PATENT DOCUMENTS

| | | | |
|---|---|---|---|
| 5,520,416 A | * 5/1996 | Singer et al. | 280/775 |
| 5,829,311 A | * 11/1998 | Roberson | 74/493 |
| 6,237,438 B1 | * 5/2001 | Ben Rhouma et al. | 74/492 |
| 6,516,567 B1 | * 2/2003 | Stone et al. | 49/343 |

* cited by examiner

Primary Examiner—Christopher P. Schwartz
Assistant Examiner—Melanie Torres
(74) Attorney, Agent, or Firm—Edmund P. Anderson

(57) ABSTRACT

A power system including a cable drive for adjusting a steering column of an automotive vehicle in response to rotation of a jack screw. A cable transmits torque from a motor-driven output shaft to the jack screw. The cable has terminal portions received in sockets in the output shaft and in the jack screw. The terminal portions and the sockets are square in cross section. An end part of each terminal portion is twisted to cause corners of the terminal portion to interfere with corners of the socket into which it extends to provide substantially a lash-free connection between the terminal portions of the cable and the sockets.

12 Claims, 2 Drawing Sheets

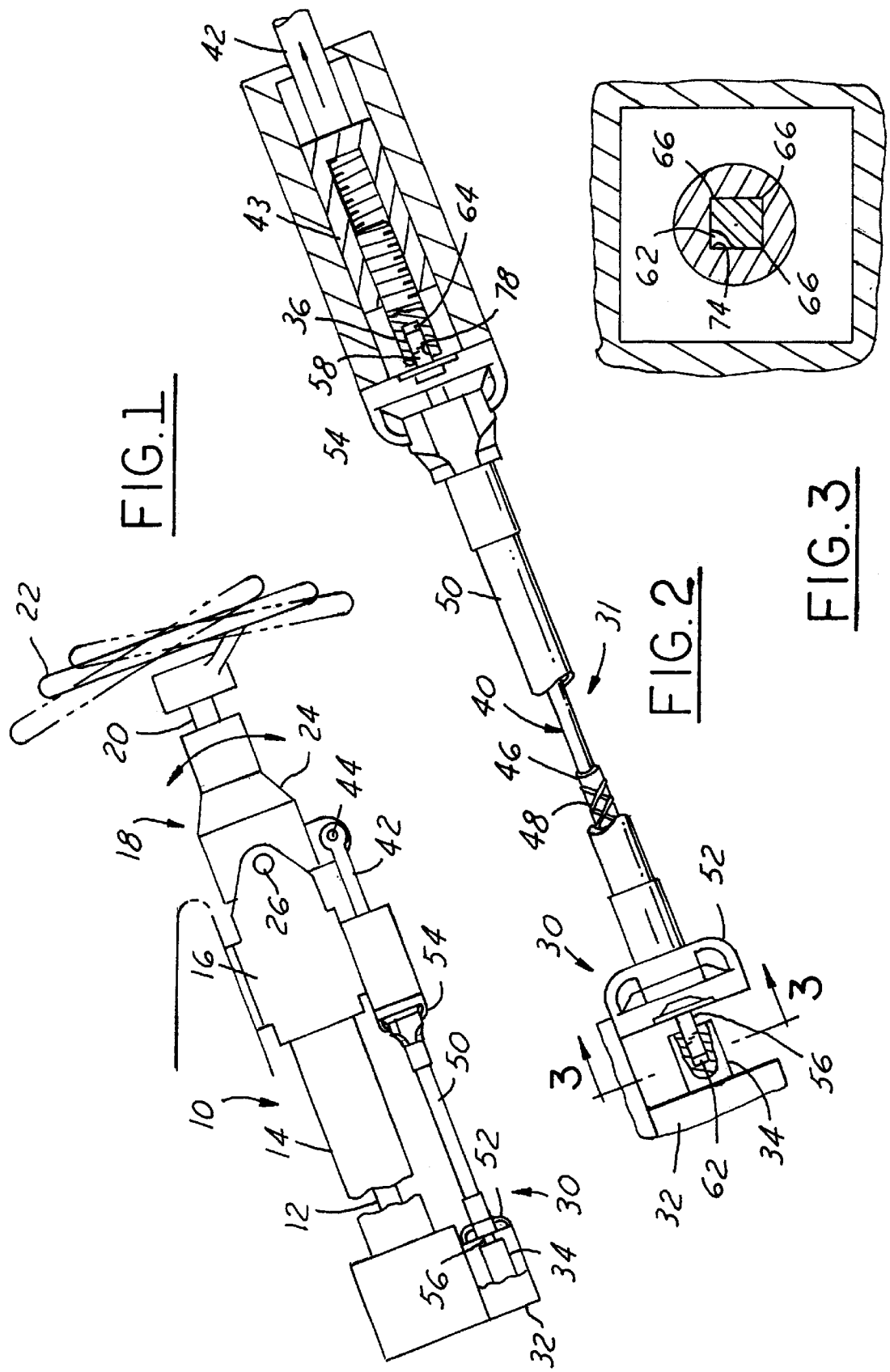

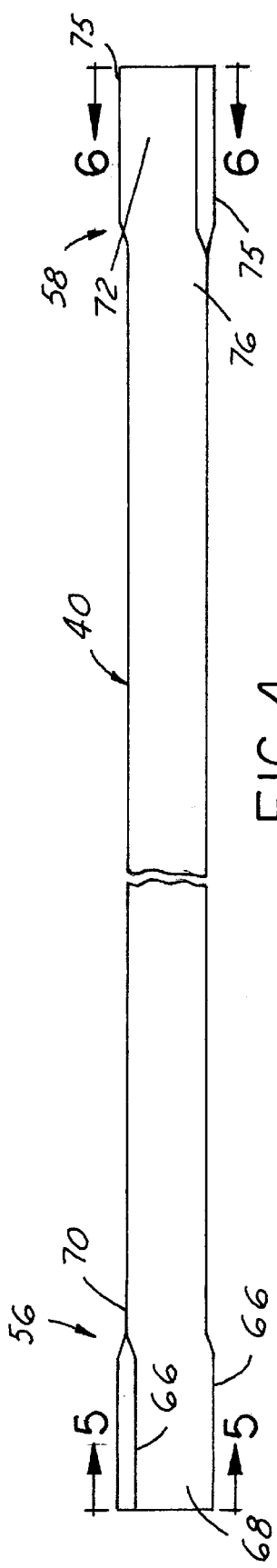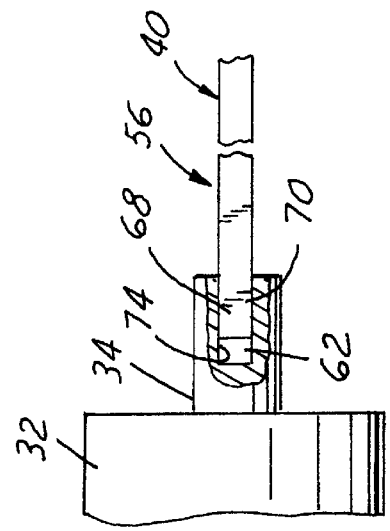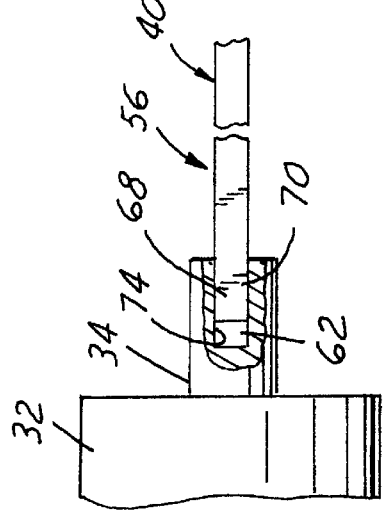

LASH-FREE CABLE DRIVE

BACKGROUND OF THE INVENTION

Technical Field

This invention relates generally to cable drive systems and more particularly to a cable drive system for adjusting the position of a steering column of an automotive vehicle.

A power system for adjusting the position of the steering column of an automotive vehicle typically includes apparatus for moving the steering column in response to rotation of a rotary driven member, often referred to as a jack screw. The jack screw is rotated by a motor-operated rotary drive member, usually the output shaft of the motor, which is connected to the jack screw by a cable. The cable transmits torque from the motor to the jack screw.

One of the problems associated with the cable drive is backlash in the connection between the ends of the cable and the rotary drive and driven members.

SUMMARY OF THE INVENTION

In accordance with the present invention, at least one of the terminal portions of the cable is polygonal and an end part of the terminal portion is twisted about the central axis of the cable to cause the corners of the terminal portion to interfere with the corners of the socket in one of the rotary members. Preferably the other terminal portion of the cable is similarly twisted. The result is a substantially lash-free cable drive.

One object of this invention is to provide a power system for adjusting the position of a steering column of an automotive vehicle having a cable drive with the foregoing features and capabilities.

BRIEF DESCRIPTION OF THE DRAWINGS

These and other features and advantages of the present invention will become more readily appreciated when considered in connection with the following detailed description and appended drawings, wherein:

FIG. 1 is a side elevational view of a steering column having a cable drive, construct accordance with this invention;

FIG. 2 is a side view of the cable and related parts;

FIG. 3 is a sectional view taken on the line 3—3 in FIG. 2;

FIG. 4 is a side view of the cable in its natural free condition;

FIG. 5 is a view of one end of the cable, taken on the line 5—5 in FIG. 4;

FIG. 6 is a view of the opposite end of the cable, taken on the line 6—6 in FIG. 4; and FIG. 7 is an enlargement of a portion of FIG. 2.

DETAILED DESCRIPTION OF THE PREFERRED EMBODIMENT

Referring now more particularly to the drawings, a steering column 10 of an automotive vehicle includes an elongated lower steering shaft section 12 supported for rotation in an elongated tubular jacket 14. The jacket 14 is attached to a bracket 16 which is secured to suitable vehicle support structure.

An upper tiltable portion 18 of the steering column 10 includes an upper steering shaft section 20 on which a steering wheel 22 is mounted. The upper steering shaft section 20 is supported for rotation in a housing 24 pivoted to the bracket 16 by pivot pin 26. The upper steering shaft section 20 is coupled to the lower steering shaft section 12 as by a universal joint (not shown) so that rotation of the upper steering shaft section 20 by the steering wheel 22 rotates the lower steering shaft section 12. The lower end of the lower steering shaft section 12 is connected by a suitable coupler of known construction to a steering gear assembly (not shown) for steering the wheels of the vehicle.

A power system 30, including a cable drive 31, is provided for adjusting the position or tilt of the upper portion 18 of the steering column. The power system 30 includes a motor 32 having a rotary drive member, specifically a motor output shaft 34. The output shaft 34 is coupled to a rotary driven member, in the form of a jack screw 36, by a flexible cable 40 of spring steel, for example. A link 42 has an end portion 43 threaded to the jack screw 36. The opposite end of the link 42 is pivoted at 44 to the housing 24. Rotation of the jack screw 36 causes linear movement of the link 42 which in turn tilts the upper portion 18 of the steering column.

The cable 40 extends lengthwise within a flexible tubular liner 46 covered by a braided wire sheath 48. The cable, liner and sheath rotate within a tubular jacket 50. The ends of the jacket 50 are secured to stationary mounting brackets 52 and 54.

The cable has a terminal portion 56 extending from one end of the cable to a point spaced from such one end. The cable has a terminal portion 58 extending from the opposite end of the cable to a point spaced from such opposite end. The terminal portion 56 of the cable extends into a socket 62 in the output shaft 34 on the axis of rotation thereof The terminal portion 58 extends into a socket 64 in the jack screw 36 on the axis of rotation thereof.

The terminal portion 56 of the cable is square in cross section throughout its length, having four flat sides intersecting at 90° angles at four corners each identified by the number 66. The end part 68 of the terminal portion 56 is twisted about the longitudinal central axis thereof so that the sides and corners of the twisted end part 68 are turned slightly from the corresponding sides and comers of the part 70 of the terminal portion adjacent to the end part 68. The amount of twist may vary, but is in a range of about 3° to 30°, and preferably is 15°. FIG. 4 shows the cable in its natural, free state condition, illustrating the twisted form of the end part 68, as well as the twisted form of the end part 72 of the terminal portion 58 as described below.

The socket 62 in the output shaft 34 of the motor is square in cross section throughout its length and the same size and shape as the terminal portion 56 and closely receives the terminal portion. However, the socket 62 is not twisted. Thus, when the terminal portion, including both of its parts 68 and 70, is received in the socket 34, the four corners of the end part 68 of the terminal portion interfere with the socket at or near the matching four comers 74 of the socket.

The terminal portion 58 of the cable is identical in cross section, size and shape, having four 90° comers 75, and with the same twist of the end part 72 relative to the part 76 adjacent to the end part 72, as the terminal portion 56. The socket 64 in which the terminal portion 58 is received is the same in cross section, size and shape as the terminal portion 56, having four comers 78. Hence, there is the same corner interference between the terminal portion 58 and the socket 64 as between the terminal portion 56 and the socket 62.

The terminal portions 56 and 58 are fully inserted in the respective sockets 62 and 64 with their ends abutting the bottoms of the sockets. The twisted end parts 68 and 72 straighten out or become untwisted when the terminal portions 56 and 58 are inserted into the sockets 62 and 64 to produce the corner interference.

The corner interference between the terminal portions 56 and 58 of the cable 40 and the receiving sockets 62 and 64 eliminates back lash so the cable transmits torque from the output shaft 34 of the motor to the jack screw 36 substantially lash free.

Preferably, the terminal portions of the cable are square in cross section as illustrated, but they may also be of other polygonal cross sections, as desired.

While the cable drive of this invention is shown in a power system for adjusting a tiltable steering column, it may also be used in a power system for adjusting a telescoping steering column.

Although developed for power tilt and telescoping steering columns, this lash-free cable drive system can be used in many other applications, such as, for example, as power seat, lumbar and headrest actuators. The system could also be used to advantage in non-automotive applications.

The disclosed embodiments are representative of presently preferred forms of the invention, but are intended to be illustrative rather than definitive thereof. The invention is defined in the claims.

What is claimed is:

1. A cable drive comprising:
   a rotary drive member;
   a rotary driven member;
   a torque transmitting cable terminally connected to the drive member and the driven member;
   said cable having a first terminal portion which is polygonal in cross-section;
   one of the rotary members having a socket which is of the same size and cross-section as said terminal portion of the cable and which closely receives said terminal portion; and
   said terminal portion having a first end part which is twisted about a central axis of said cable to cause corners of said terminal portion to interfere with corners of said socket and thereby provide substantially a lash-free connection between said terminal portion of the cable and the socket.

2. A cable drive as defined in claim 1, wherein said first end part of said terminal portion of the cable is twisted from about 3° to about 30° relative to a second part of said terminal portion adjacent to said first end part.

3. A cable drive as defined in claim 1, wherein said terminal portion is of uniform square cross section throughout its length.

4. A cable drive as defined in claim 3, wherein said first end part of said terminal portion of the cable is twisted approximately 15° relative to a second part of said terminal portion adjacent to said first end part.

5. A cable drive as defined in claim 1, wherein said cable has a second terminal portion which is polygonal in cross section, the other of the rotary members has a second socket which is of the same size and cross section as said second terminal portion of the cable and closely receives said second terminal portion, and wherein a second end part of said second terminal portion is twisted about the central axis of said cable to cause corners of said second terminal portion to interfere with corners of said second socket and thereby provide substantially a lash-free connection between said second terminal portion of the cable and the second socket.

6. A cable drive as defined in claim 5, wherein each of said terminal portions is of uniform, square cross section throughout its length.

7. A cable drive as defined in claim 6, wherein said first end part of said first terminal portion of the cable is twisted about a central axis of the cable from about 3° to about 30° relative to another part of said first terminal portion adjacent to said first end part, and said second end part of said second terminal portion of the cable is twisted about the central axis of the cable from about 3° to about 30° relative to another part of the second terminal portion adjacent to said second end part.

8. A cable drive as defined in claim 6, wherein said first end part of said first terminal portion of the cable is twisted about a central axis of the cable approximately 15° relative to another part of said first terminal portion adjacent to said first end part, and said second end part of said second terminal portion of the cable is twisted about the central axis of the cable approximately 15° relative to another part of the second terminal portion adjacent to said second end part.

9. A cable drive for adjusting a steering column of an automotive vehicle, comprising:
   a motor driven rotary drive member;
   a rotary driven member;
   a torque transmitting cable terminally connected to the drive member and the driven member;
   said cable having a first and second terminal portions, each of which is polygonal in cross-section;
   said rotary drive member having a first socket which is of the same size and cross-section as said first terminal portion of the cable and which closely receives said first terminal portion;
   said rotary driven member having a second socket which is of the same size and cross-section as said second terminal portion and which closely receives said second terminal portion;
   said first and second terminal portions having respectively first and second end parts which are twisted about a central axis of said cable to cause corners of said first and second terminal portions to interfere with corners of said respective first and second sockets in which they are received to thereby provide substantially a lash-free connection between said terminal portions and said sockets; and
   means connecting said driven member to the steering column.

10. A cable drive as defined in claim 9, wherein each of said terminal portions is of uniform square cross-section throughout its length.

11. A cable drive as defined in claim 10, wherein said first end part of said first terminal portion of the cable is twisted from about 3° to about 30° relative to another part of said first terminal portion adjacent to said first end part, and said second end part of said second terminal portion of the cable is twisted from about 3° to about 30° relative to another part of said second terminal portion adjacent to said second end part.

12. A cable drive as defined in claim 10, wherein said first end part of said first terminal portion of the cable is twisted approximately 15° relative to another part of said first terminal portion adjacent to said first end part, and said second end part of said second terminal portion of the cable is twisted approximately 15° relative to another part of said second terminal portion adjacent to said second end part.

* * * * *